United States Patent Office 3,403,107
Patented Sept. 24, 1968

1

3,403,107
PRODUCTION OF NON-IONIC SURFACTANT
COMPOSITIONS
Richard C. Myerly, Charleston, W. Va., assignor to Union
Carbide Corporation, a corporation of New York
No Drawing. Continuation-in-part of application Ser. No.
478,857, Aug. 11, 1965. This application Aug. 21, 1967,
Ser. No. 661,834
17 Claims. (Cl. 252—137)

ABSTRACT OF THE DISCLOSURE

Non-ionic detergents containing a straight chain, non-ionic surfactant are spray dried in the presence of a phenolic or amine compound to reduce smoke formation in the spray drier.

The specific examples disclose spray drying a non-ionic ethylene oxide adduct of a mixture of $C_{11}$–$C_{15}$ secondary straight chain alkanols and butylated hydroxy anisole; 2,2' - methylenebis(4-methyl-6-tert-butyl-phenol), poly-butylated bisphenol A, bisphenol A, di-tert,butyl-p-cresol, trimeric diphenylamine acetone condensate, nordihydroguaiaretic acid, p-(p - toluenesulfonylamide)diphenylamine, hydroquinone and propyl gallate.

This is a continuation-in-part application of Ser. No. 478,857, filed Aug. 11, 1965.

This invention is concerned with an improved method for producing non-ionic surfactant compositions. More particularly, this invention is concerned with an improved method for spray drying non-ionic surfactant compositions.

Dry particulate detergent compositions based upon non-ionic surfactants are of considerable commercial importance. These compositions, in addition to the non-ionic surfactant, normally contain a builder or complexing agent, such as an alkali metal salt of a condensed phosphate, preferably sodium tripolyphosphate, or an alkali metal silicate, preferably sodium metasilicate, which also serves as a corrosion inhibitor; a soil redeposition inhibitor, such as an alkali metal preferably sodium carboxymethyl cellulose; and an inert diluent, generally an alkali metal sulfate and preferably sodium sulfate. Normally the dry composition will contain 5 to 20 weight percent non-ionic surfactant, 20 to 60 weight percent alkali metal condensed phosphate, 5 to 20 weight percent alkali metal silicate, 0.5 to 5 weight percent soil redeposition inhibitor, and the balance diluent. In addition, the commercial product may contain a few percent water, based upon the dry components. Moreover, small amounts of optical brighteners, foam boosters and other commonly employed additives may be present.

These dry formulations are often obtained by spraying an aqueous slurry, generally containing about 60 to about 70 percent solids, of the desired composition into a hot gas stream, generally flue gas from a gas- or oil-heated furnace which has been tempered with cool air. The temperature of the heated influent air is in the range of 350–750° F., depending upon whether the slurry and air are contacted in a co-current or a counter-current manner. Thus, influent temperatures of about 350–450° F. are normally employed in counter-current operation and temperatures of about 600–750° C. are normally employed in co-current operation. In either case, the temperature of the effluent gas is about 200° F.

In the past, the non-ionic surfactant was an ethylene oxide adduct of a branched-chain alkyl phenol. Recently, however, the need for biodegradable detergents has occasioned the use as the non-ionic surfactant an ethylene oxide adduct of a straight chain alcohol, as represented by the general formula:

(I) 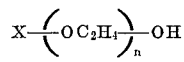

wherein X is the hydrophobic residue of a straight chain monohydric alcohol or monohydric ether alcohol formed by removal of the hydroxyl group of the alcohol, and $n$ has a value such that the adduct has surface active properties. Normally X is a primary or secondary straight chain higher alkyl group of from about 6 to about 25 carbon atoms and $n$ has a value of from about 2 to about 50, but X may also be derived from adducts of propylene oxide or a mixture of ethylene oxide and propylene oxide and a lower (i.e., $C_1$ to $C_6$) and preferably butyl alkanol. These latter adducts, referred to herein as ether alcohols, may be illustrated by the formula:

(II) 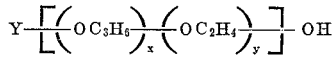

wherein Y is lower alkyl, $x$ is a positive number, $y$ is zero or a positive number and the values of x and y are such that the molecular weight of the ether alcohol is in the range of from about 500 to about 3000. It should be noted that Formula (II) is not intended to imply that the ethyleneoxy (—$C_2H_4O$—) and the propyleneoxy

units are in any particular order. To the contrary they are present in a random order. When X in Formula (I) is derived from an ether alcohol of Formula (II) the value of $n$ is normally in the range of from about 10 to about 100.

The subscripts $n$, $x$ and $y$ in Formulae (I) and (II) may be whole or fractional numbers. These ether alcohols are generally mixtures of alkylene oxide adducts, with Formulae (I) and (II) intending to represent the average composition of the adduct. Moreover, the lower alkyl residue of Formula (II) and the higher alkyl residue of Formula (I) can be derived from a mixture of alcohols of different molecular weights.

Preferred non-ionic surfactants have the general formula:

(III) 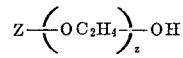

wherein Z is a straight chain alkyl group of from about 8 to about 18 carbons and z has a value of from about 4 to about 20.

A serious drawback to the use of these non-ionic surfactants in dry detergent formulations has been their tendency to generate a heavy smoke when spray-dried by conventional techniques, thus creating a serious air pollution problem. The exact cause of the smoking is not definitely established, but the smoke is believed to be due to combustion of the non-ionic detergent under the severe conditions of high temperature and high oxygen concentration (generally about 10 to about 18 percent) in the spray dryer.

It has been discovered by this invention that the smoking of slurries containing the biodegradable non-ionics of the Formula (I), and especially Formula (III), can be considerably reduced and, in some cases, essentially completely suppressed by effecting the spray drying in the presence of certain phenolic compounds or aromatic amines.

The phenolic compounds which are employed in accordance with this invention contain at least one benzene ring having bonded thereto at least one hydroxyl group and at least one additional substituent in a non-meta-position, i.e., in the ortho- or para-position, with respect to the hydroxyl group. Preferred substituents are hydroxyl groups and bulky groups such as branched chain alkyl groups, cycloalkyl groups and groups containing at least one aryl moiety, such as phenethyl and the like. Additional substituents may be present provided at least one, and preferably at least two, of the carbons of the benzene ring are unsubstituted. These compounds may be broadly represented by the formula:

(IV)

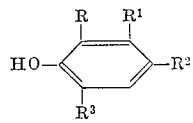

wherein R can be hydrogen, hydroxyl, halogen such as chlorine, hydrocarbyl free from non-benzenoid unsaturation of up to about 10 carbons, such as alkyl, including methyl, ethyl, tert-butyl, sec-amyl and tt-octyl (2,2,3,3-tetramethylbutyl), aralkyl including phenethyl, and cycloalkyl or alkylcycloalkyl such as cycohexyl, methylcyclohexyl, and the like; $R^1$ can be hydrogen, alkyl of from 1 to about 10 carbons, alkoxy of from 1 to about 10 carbons, alkanoyloxy of from 2 to about 10 carbons such as acetoxy and propionoxy, or aroyloxy of from 7 to about 10 carbons such as benzoyloxy, and the like; $R^2$ can be hydrogen, hydroxyl, carboxyl, alkyl of from 1 to about 10 carbons, alkoxy of from 1 to about 10 carbons, alkoxyalkyl, for example methoxymethyl, of from 2 to about 10 carbons, dialkylaminoalkyl, for example dimethylaminomethyl, of from 3 to about 10 carbons, alkoxycarbonyl of from 2 to about 15 carbons such as ethoxycarbonyl, propoxycarbonyl, butoxycarboxyl, and dodecoxycarbonyl, and radicals free from non- benzenoid unsaturation of up to about 20 carbons containing a hydroxyl-substituted benzene ring, such as 1,2,3,4-tetrahydro - 2 - carboxy - 3,6,7 - trihydroxynaphth - 4 - yl - α-lactone, 2,2,3,3 - tetramethyl - 4 - (3,4-dihydroxyphenyl)-butyl, 4-hydroxyphenyl and alkyl derivatives thereof, 4-hydroxyphenylalkyl and alkyl derivatives thereof, 4-hydroxyphenylthio and alkyl derivatives thereof and the like; $R^3$ can be hydrogen, hydroxyl, alkyl of 1 to about 10 carbons, and radicals free from non-benzenoid unsaturation containing up to about 20 carbons containing a hydroxy-substituted benzene ring such as 2-hydroxybenzyl and alkyl derivatives thereof, phenyl-2-hydroxybenzyl and alkyl derivatives thereof. 2-hydroxyphenylthio and alkyl derivatives thereof, and the like; and R and $R^1$, when taken together, form a divalent 1,4-butadienylene radical or a monoalkyl-substituted 1,4-butadienylene radical of up to about 15 carbons. The substituents should be such that the phenolic compound contains at least one hydroxyl group, but preferably no more than two hydroxyl groups on a single benzene ring.

Subgeneric to the phenols of Formula (IV) are (a) the monohydric phenols of the formula:

(V)

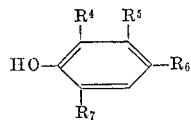

wherein $R^4$ is hydrogen or hydrocarbyl of up to about 10 carbons free from non-benzenoid unsaturation, preferably branched alkyl or aralkyl; $R^5$ is hydrogen, alkyl of up to about 10 carbons, alkoxy of up to about 10 carbons and benzoyloxy, and preferably is hydrogen; $R^6$ is hydrogen, alkyl of up to about 10 carbons, hydrocarbyloxy free from non-benzenoid unsaturation such as alkoxy of up to about 10 carbons; alkoxyalkyl of up to about 10 carbons and dialkylaminoalkyl of 3 to about 10 carbons, and preferably is methyl; and $R^7$ is hydrogen, alkyl of up to about 10 carbons, preferably branched alkyl, or phenylcarbonyl; (b) polyhydric phenols, i.e., phenols having at least two hydroxyls on a single benzene ring, and preferably only two non-meta hydroxyls, of the formula:

(VI)

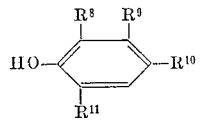

wherein $R^8$ is hydrogen, hydroxyl or alkyl of 1 to about 10 carbons, preferably branched alkyl; $R^9$ is hydrogen or alkyl of 1 to about 10 carbons; $R^{10}$ is hydrogen, hydroxyl, carboxyl, and alkoxycarbonyl of up to about 15 carbons; and $R^{11}$ is hydrogen, hydroxyl or alkyl of up to about 10 carbons; and (c) bisphenols, including ortho-ortho' bisphenols of the formula:

(VII)  Ar—A—Ar wherein A is thio or hydrocarbylidine of 1 to about 10 carbons such as benzylidine or methylene; and Ar is either a 2-hydroxyphenyl radical of the formula:

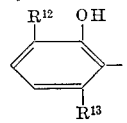

wherein $R^{12}$ is hydrogen, chloro or saturated hydrocarbyl such as alkyl of up to about 10 carbons and $R^{13}$ is chloro or alkyl of up to about 5 carbons, or a 2-hydroxy-6-alkyl-1-naphthyl group the alkyl radical of which contains up to about 10 carbons; and para-para' bisphenols of the formula:

(VIII)

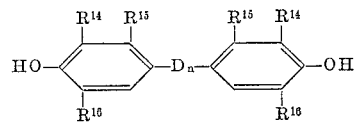

wherein $R^{14}$ is hydrogen or lower alkyl of up to about 6 carbons,, $R^{15}$ is hydrogen or lower alkyl of up to about 6 carbons, $R^{16}$ is hydrogen or lower alkyl of up to about 6 carbons and is preferably a branched chain alkyl, D is a thio group or an alkylidene group of from 1 to about 6 carbons and $n$ is an integer having a value of from 0 to 1, inclusive.

Illustrative of these phenolic compounds are monohydric phenols such as hydroquinone monomethyl ether,
hydroquinone monoethyl ether,
hydroquinone monobenzyl ether,
2-hydroxy-4-methoxybenzophenone,
resorcinol monobenzoate,
2,6-di-tert-butyl-4-methylphenol,
2,6-di-tert-butyl-4-(methoxymethyl)phenol,
2,6-di-tert-butyl-4-(dimethylaminomethyl)phenol,
2,6-di-tert-butylphenol,
3-tert-butyl-4-hydroxyanisole,
2-tert-butyl-4-hydroxyanisole,
styrenated phenol,
4-tert-butylphenol,
2,4,6-tri-tert-butylphenol,
2-tert-butylphenol and the like;
polyhydric phenols, such as
hydroquinone,
mono-tert-butylhydroquinone,
2,5-di-tert-butylhydroquinone,
2,5-di-tert-amylhydroquinone,
gallic acid (3,4,5-trihydroxybenzoic acid),
ethyl gallate,
propyl gallate,
butyl gallete,
dodecyl gallate,
conidendrol (4-(3,4-dihydroxyphenyl)-1,2,3,4-tetrahydro-6,7-dihydroxy-3-(hydroxymethyl)-2-naphthoic acid γ-lactone),
nordihydroguiaretic acid (1,4-bis(3,4-dihydroxyphenyl)-2,3-dimethylbutane) and the like;

ortho-ortho' bisphenols such as 2,2'methylenebis(4-methyl-6-tert-butylphenol),
2,2'-thiobis(4,6-dichlorophenol),
2,2'-methylenebis(4-ethyl-6-tert-butylphenol),
2,2'-methylenebis-[4-methyl-6-(1-methylcyclohexyl)-phenol],
2,2'-thiobis(6-tt-octyl-4-methylphenol),
1,1'-benzylidenebis(6-tert-butyl-2-naphthol),
1,1'-benzylidenebis(6-tt-octyl-2-naphthol),
1,1'-thiobis(6-tert-butyl-2-naphthol) and the like;
and para-para' bisphenols such as
bisphenol A (4,4'-isopropylidenebisphenol),
butylated bisphenol A,
4,4'-thiobis(3-methyl-6-tert-butylphenol),
4,4'-bis(2-methyl-6-tert-butylphenol),
4,4'-methylenebis(2,6-di-tert-butylphenol),
4,4'-methylenebis(2-methyl-6-tert-butylphenol,
4,4'-thiobis(di-sec-amylphenol),
4,4'-bis(di-sec-amylphenol) and the like.

The aromatic amines which are employed in accordance with this invention comprise a benzene ring having bonded thereto an amine nitrogen and at least one other substituent, which may be in the form of an amine or substituted amine group, an alkyl or other monovalent hydrocarbon group or a divalent group bonded either to two adjacent carbons of the benzene ring or to the amine group and a carbon of the benzene ring which is adjacent to the carbon bearing the amine group to form a 5- or 6-membered carbocyclic or heterocyclic ring fused to said benzene ring. These aromatic amines may be represented broadly by the formula:

(IX)

wherein Ar is an aromatic nucleus of up to about 10 carbons, such as a benzene or a naphthalene nucleus; $R^{17}$ is hydrogen, amino, or mono- or di-substituted amino such as phenylamino, naphthylamino, alkylamino, alkylnaphthylamino where said alkyl group contains from 1 to about 6 carbons $R^{18}$ is hydrogen, or alkyl; $R^{19}$ is hydrogen, hydrocarbyl free from non-benzenoid unsaturation of up to 10 carbons or arylaminoalkyl wherein the aryl group is phenyl or naphthyl and the alkyl group contains about 2 to about 3 carbons; and $R^{17}$ and $R^{18}$, when taken together, form a divalent radical which, when taken with Ar, forms a 5- to 6-membered fused ring bonded to Ar through adjacent carbons.

Subgeneric to the aromatic amines of Formula (IX) are the acyclic amines of the formula:

(X)
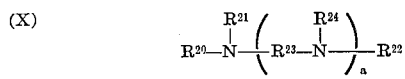

wherein $a$ is 0 to 1, $R^{20}$ is hydrogen, hydrocarbyl or substituted hydrocarbyl of up to about 20 carbons, and preferably alkyl, phenyl or naphthyl; $R^{21}$ is hydrogen or lower alkyl of from 1 to about 6 carbons and preferably is hydrogen; $R^{22}$ is hydrogen, hydrocarbyl or substituted hydrocarbyl free from non-benzenoid unsaturation of up to about 20 carbons, and preferably is alkyl or phenyl; $R^{23}$ is divalent hydrocarbylene of up to about 15 carbons such as alkylene or phenylene and is preferably 1,4-phenylene; and $R^{24}$ is hydrogen or lower alkyl and is preferably hydrogen; and the heterocyclic amines of the formula:

(XI)
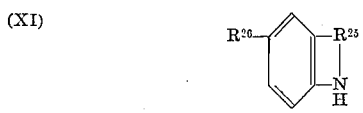

wherein $R^{25}$ is a divalent radical of up to about 10 carbons which, when taken with the aminophenyl group, forms a non-aromatic heterocyclic ring of from 5 to 6 ring members and $R^{26}$ is hydrogen, alkyl of 1 to about 15 carbons and alkoxy of 1 to about 15 carbons.

Illustrative examples of these amines include
2,4-toluenediamine,
4,4'-diaminodiphenylmethane,
diphenylamine,
octylated diphenylamine,
nonylated diphenylamine,
phenyl-1-naphthylamine,
phenyl-2-naphthylamine,
4-isopropoxydiphenylamine,
4,4'-dimethoxydiphenylamine,
4-(4-methylphenylsulfonylamido)diphenylamine,
N,N'-diphenyl-1,4-phenylenediamine,
N-phenyl-N'-(2-naphthyl)-1,4-phenylenediamine,
N-phenyl-N'-isopropyl-1,4-phenylenediamine,
N-phenyl-N'-sec-butyl-1,4-phenylenediamine,
N-(4-methylphenyl)-N'-isopropyl-1,4-phenylenediamine,
N-phenyl-N'-cyclohexyl-1,4-phenylenediamine,
N,N'-di-2-octyl-1,4-phenylenediamine,
N,N'-di-3-(5-methylheptyl)-1,4-phenylenediamine,
N,N'-di-sec-butyl-1,4-phenylenediamine,
N,N'-diheptyl-1,4-phenylenediamine,
N,N'-bis(1,4-dimethylpentyl)-1,4-phenylenediamine,
N,N'-diphenylethylenediamine,
N,N'-di-o-tolylethylenediamine,
N,N'-diphenylpropylenediamine,
N,N'-dimethyl-N,N'-di(1-methylpropyl)1,4-phenylenediamine,
phenothiazole,
1,2-dihydro-2,2,4-trimethylquinoline,
6-ethoxy-1,2-dihydro-2,2,4-trimethylquinoline,
6-lauryl-1,2-dihydro-2,2,4-trimethylquinoline and the like In addition to monomeric amines, one can also employ the condensation products of certain amines with aldehydes, preferably acetaldehyde, butyraldehyde or aldol, or ketones, preferably acetone. Illustrative of these condensates are the 1-naphthylamine-acetone condensate, particularly the trimeric condensate having a molecular weight of about 500, the aniline-butyraldehyde condensate, the aniline-acetaldehyde condensate, and the N-phenyl-2-naphthylamine-acetone condensate.

The smoke-inhibiting amount of phenolic compound or aromatic amine is not narrowly critical, and suitable amounts can be readily determined by simple experiments. The amount will depend primarily upon the amount of non-ionic detergent present in the slurry, the temperature at which the spray drying is effected and the time the composition is at elevated temperatures. In general, however, the effective amount will be in the range from about 100 parts per million parts of non-ionic detergent up to about 1 weight percent or more, based upon the weight of the detergent. Amounts in the range of about 500 to about 5000 parts per million are preferred.

The smoke inhibitor can be introduced into the spray dying zone in any desired manner. It is convenient and preferred to add the smoke inhibitor to the aqueous slurry prior to charging to the spray drying step.

The following examples are illustrative.

EXAMPLE 1

A moist powder was prepared by mixing 2 parts by weight of a commercially-available surfactant marketed under the trade name "TERGITOL Non-ionic 15–S–9," which is an ethylene oxide adduct of a mixture of $C_{11}$ to $C_{15}$ secondary straight-chain alkanols having an average of 13 carbons and containing an average of 9 ethyleneoxy units, 6.17 parts by weight sodium sulfate, 6.67 parts by weight sodium tripolyphosphate, 0.167 parts by weight sodium carboxymethylcellulose and 1.67 parts by weight of a 43.5 percent aqueous sodium silicate solution. To two samples of this formulation were added 1000 parts per million based upon "TERGITOL Non-ionic 15–S–9," of either 2,2'-methylene-bis(4-methyl-6-tert-butylphenol) or butylated hydroxyanisole.

Each of these samples was placed on a moisture balance and heated at 140–70° C. to dry the composition. The percent weight loss was recorded at minute intervals over a period of 30 minutes, and then plotted against time. These plots are reproduced in the attached figure, as well as the plot obtained by a similar experiment with no inhibitor added. As is seen from the figure, the graph of weight loss against time comprises three segments: (1) an initial rapid weight loss of from about 5 to 7 percent in the first 5 minutes representing the evaporation of the free water or induction period; (2) a substantially flat portion representing the inhibition period, which is absent for the untreated control, and (3) a final portion of slowly increasing weight loss indicating loss of inhibition, which was not obtained with the alcohol ethoxylate containing butylated hydroxyanisole.

The data for these three runs are summarized in tabular form as follows:

TABLE I

| Inhibitor | Induction Period | | Inhibition Period, Minutes | Final Period | |
|---|---|---|---|---|---|
| | Percent Weight Loss | Minutes | | Percent Weight Loss | Minutes |
| Butylated hydroxyanisole | 6.5 | 7 | 23.5 | 0 | 0 |
| 2,2'-methylenebis(4-methyl-6-tert-butylphenol) | 6.8 | 5 | 13 | 0.8 | 12 |
| None | 6.5 | 5 | 0 | 5 | 25 |

EXAMPLE 2

Employing techniques similar to those described in Example 1, the following compounds were evaluated as inhibitors:

(A) Polybutyl bisphenol A.
(B) Bisphenol A.
(C) Di-tert-butyl-p-cresol.

The results of these tests are summarized in Table II.

TABLE II

| Additive | Induction Period | | Inhibition Period, Minutes | Final Period | |
|---|---|---|---|---|---|
| | Percent Weight Loss | Minutes | | Percent Weight Loss | Minutes |
| A | 6.6 | 6 | 24 | 0 | 0 |
| B | 6.6 | 8 | 15 | 0.6 | 7 |
| C | 6.4 | 7 | 10 | 1.5 | 13 |
| None | 6.5 | 5 | 0 | 5 | 25 |

EXAMPLE 3

Employing techniques similar to those described in Example 1, formulations were made up containing 50 parts per million of di-tert-butyl-p-cresol and 1000 parts per million of:

(D) Trimeric diphenylamine-acetone condensate sold under the trade name "Aminox."
(E) Noridihydroguaiaretic acid.
(F) p-(p-toluenesulfonylamide)diphenylamine.
(G) Hydroquinone.
(H) Propyl gallate.

The results of the tests on these formulations are summarized in Table III.

TABLE III

| Additive | Induction Period | | Inhibition Period, Minutes | Final Period | |
|---|---|---|---|---|---|
| | Percent Weight Loss | Minutes | | Percent Weight Loss | Minutes |
| D | 6 | 7 | 24 | 0 | 0 |
| E | 6.2 | 5 | 25 | 0 | 0 |
| F | 6.5 | 7 | 19 | 0.2 | 4 |
| G | 6.6 | 6 | 9 | 1.9 | 15 |
| H | 6.6 | 5 | 3 | 4.9 | 22 |
| None | 6.5 | 6 | 0 | 5 | 25 |

EXAMPLE 4

An aqueous slurry of the formulation of Example 1 (60–70 percent solids) and containing 4000 parts per million of di-tert-butyl-p-cresol was spray dried according to conventional techniques. A very light fume was observed escaping from the top of the tower. When a similar formulation, which contained no tert-butyl cresol, was spray dried under similar conditions, a very heavy smoke was generated.

What is claimed is:

1. A composition of matter suitable for producing a dry particulate detergent formulation by spray drying consisting essentially of an aqueous slurry of from about 5 to about 20 parts by weight of a straight chain non-ionic surfactant, from about 20 to about 60 parts by weight of an alkali metal phosphate, from about 5 to about 20 parts by weight of an alkali metal silicate, from about 0.5 to about 5 parts by weight of a soil redeposition inhibitor, and a smoke inhibiting amount of at least one compound selected from the group consisting of (1) a phenolic compound represented by the formula:

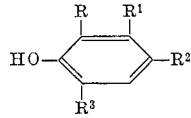

wherein R is a member selected from the group consisting of hydrogen, hydroxyl, halogen alkyl, having from 1 to about 10 carbons, aralkyls having up to about 10 carbon atoms and cyclo alkyls or alkylcycloalkyls having up to about 10 carbon atoms; $R^1$ is a member selected from the group consisting of hydrogen, alkyl having from 1 to about 10 carbon atoms, alkoxy, having from 1 to about 10 carbon atoms, alkanoyloxy having from 2 to about 10 carbon atoms and aroyloxy having from 7 to about 10 carbon atoms; $R^2$ is a member selected from the group consisting of hydrogen, hydroxyl, carboxyl, alkyl having from 1 to about 10 carbon atoms, alkoxyalkyl having from 2 to about 10 carbon atoms, dialkylaminoalkyl having from 3 to about 10 carbon atoms, alkoxycarbonyl having from 2 to about 15 carbons and a 6 to about 20 carbon atom radical, selected from the group consisting of 1,2,3,4-tetrahydro-2-carboxy-3,6,7-trihydroxynaphth-4-yl - γ - lactone, 2,2,3,3-tetramethyl-4-(3,4-dihydroxylphenyl)butyl, 4 - hydroxylphenyl and alkyl derivatives thereof, 4-hydroxyphenylalkyl and alkyl derivatives thereof, 4-hydroxyphenylthio and alkyl derivatives thereof; $R^3$ is a member selected from the group consisting of hydrogen, hydroxyl, alkyl having from 1 to about 10 carbon atoms, aroyl having from 6 to about 10 carbon atoms and a 6 to about 20 carbon atoms radical, selected from the group consisting of 2-hydroxybenzyl and alkyl derivatives thereof, phenyl-2-hydroxybenzyl and alkyl derivatives thereof, 2-hydroxyphenylthio and alkyl derivatives thereof, and R and $R^1$ when taken together, form a member selected from the group consisting of a divalent 1,4-butadienylene radical and a monoalkyl-substituted 1,4-butadienylene radical of up to about 15 carbons; with the proviso that said R, $R^1$ $R^2$, and $R^3$ are so chosen that said phenolic compound contains at least one hydroxyl group per compound, but no more than two hydroxyl groups on a single benzene ring; (2) an aromatic amine represented by the formula:

wherein Ar is an aromatic nucleus of 6 to about 10 carbon atoms; $R^{17}$ is a member selected from the group consisting of hydrogen, amino, mono-substituted amino selected from the group consisting of phenylamino, naphthylamino or alkylamino having from 1 to about 15 carbon atoms and disubstituted amino having from 2 to about 15 carbon atoms selected from the group consisting of dialkylamino, phenylalkyl amino and naphthylalkyl amino; $R^{18}$ is a member selected from the group consisting of hydrogen and alkyl from 1 to about 10 carbon atoms; and $R^{17}$ and $R^{18}$ when taken together, form a divalent radical which, when taken together with —$ArNR^{19}$, forms a 5 to 6 carbon atom fused ring bonded to Ar through adjacent carbons; $R^{19}$ is selected from the group consisting of hydrogen or arylaminoalkyl wherein such aryl group is phenyl or naphthyl, the alkyl group containing 2 to about 3 carbons; and (3) a condensation product of (a) an aromatic amine selected from the group consisting of aniline, naphthylamine, diphenylamine and N-phenylnaphthylamine and (b) a carbonyl compound selected from the group consisting of aldol, acetaldehyde, butyraldehyde and acetone.

2. The composition of claim 1 where said phenolic compound is of the formula:

(V) 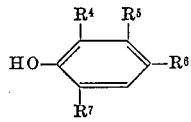

wherein $R^4$ is selected from the group consisting of hydrogen or 1 to about 10 carbon atom alkyl or 7 to about 10 carbon atom aralkyl; $R^5$ is selected from the group consisting of hydrogen, alkyl of up to about 10 carbons, alkoxy of up to about 10 carbons or benzoyloxy; $R^6$ is selected from the group consisting of hydrogen, alkyl of up to about 10 carbons, alkoxy of up to about 10 carbons; alkoxyalkyl of up to about 10 carbons and dialkylaminoalkyl of 3 to about 10 carbons; and $R^7$ is selected from the group consisting of hydrogen, alkyl of up to about 10 carbons, or phenylcarbonyl.

3. The composition of claim 1 where said phenolic compound is of the formula:

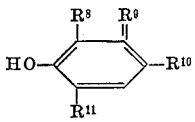

wherein $R^8$ is selected from the group consisting of hydrogen, hydroxyl or alkyl of 1 to about 10 carbons; $R^9$ is selected from the group consisting of hydrogen, or alkyl of 1 to about 10 carbons; $R^{10}$ is selected from the group consisting of hydrogen, hydroxyl, carboxyl, or alkoxycarbonyl of 1 to about 15 carbons; and $R^{11}$ is selected from the group consisting of hydrogen, hydroxyl or alkyl of 1 to about 10 carbons.

4. The composition of claim 1 where said phenolic compound is of the formula:

wherein A is selected from the group consisting of thio, benzylidine or methylene; and Ar is selected from the group consisting of a 2-hydroxyphenyl radical of the formula:

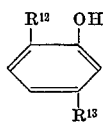

or a 2-hydroxy-6-alkyl-1-naphthyl group the alkyl radical of which contains 1 to about 10 carbons wherein $R^{12}$ is selected from the group consisting of hydrogen, chloro or alkyl of 1 to about 10 carbons and $R^{13}$ is selected from the group consisting of chloro or alkyl of 1 to about 5 carbons.

5. The composition of claim 1 where said phenolic compound is of the formula

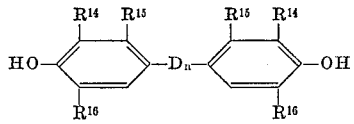

wherein $R^{14}$, $R^{15}$ and $R^{16}$ are selected from the group consisting of hydrogen or lower alkyl of 1 to about 6 carbons, D is selected from the group consisting of a thio group or an alkylidene group of from 1 to about 6 carbons and $n$ is an integer having a value of from 0 to 1, inclusive.

6. The composition of claim 1 where said amine is of the formula:

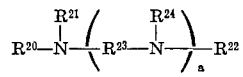

wherein $a$ is 0 to 1; $R^{20}$ is selected from the group consisting of hydrogen, 1 to about 20 carbons alkyl, phenyl or naphthyl; $R^{21}$ is selected from the group consisting of hydrogen or a 1 to about 6 carbon alkyl; $R^{22}$ is selected from the group consisting of hydrogen, of 1 to about 20 carbon alkyl or phenyl; $R^{23}$ is 1,4-phenylene; and $R^{24}$ is hydrogen or lower alkyl and is preferably hydrogen.

7. The composition of claim 1 where said amine is of the formula:

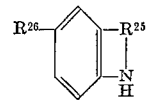

wherein $R^{25}$ is a divalent radical of up to 10 carbons which, when taken with the aminophenyl group, forms a non-aromatic nitrogen heterocyclic ring of from 5 to 6 ring members and alkyl substitutes thereof and $R^{26}$ is selected from the group consisting of hydrogen alkyl of 1 to about 15 carbons and alkoxy of 1 to about 15 carbons.

8. The composition of claim 1 where said compound is selected from at least one member of the group consisting of butylated hydroxyanisole; 2,2′-methylenebis(4-methyl-6-tertiary-butylphenol); polybutylated 2,2-bis(4-hydroxyphenol)propane; 2,2 - bis(4-hydroxyphenolpropane; ditertiary butyl-p-cresol, trimericdiphenylamine-acetone condensate; nordihydroguaiaretic acid; p-(p-toluenesulfonylamine) diphenylamine; hydroquinone; and propyl gallate.

9. In the process for producing a dry particulate detergent formulation containing as essential components from about to about 20 parts by weight of a straight chain non-ionic surfactant, from about 20 to about 60 parts by weight of an alkali metal phosphate, from about 5 to about 20 parts by weight of an alkali metal silicate, from about 0.5 to about 5 parts by weight of a soil redeposition inhibitor, the improvement of spraying an aqueous slurry of said composition into a heated gas stream at a temperature of from about 200° F. to about 750° F. in the presence of a smoke inhibiting amount of at least one compound selected from the group consisting of (1) a phenolic compound represented by the formula:

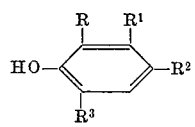

wherein R is a member selected from the group consisting of hydrogen, hydroxyl, halogen, alkyl having from 1 to about 10 carbon aralkyls having up to about 10 carbon atoms and cycloalkyl or alkylcycloalkyls having up to about 10 carbon atoms; $R^1$ is a member selected from the group consisting of hydrogen, alkyl having from 1 to about 10 carbon atoms, alkoxy having from 1 to about 10 carbon atoms, alkanoyloxy having from 2 to about 10 carbon atoms and aroyloxy having from 7 to about 10 carbon atoms; $R^2$ is a member selected from the group consisting of hydrogen, hydroxyl, carboxyl, alkyl having from 1 to about 10 carbon atoms, alkoxyalkyl having from 2 to about 10 carbon atoms, dialkylaminoalkyl having from 3 to about 10 carbon atoms, alkoxycarbonyl having from 2 to about 15 carbons and a 6 to about 20 carbon atom radical, selected from the group consisting of 1,2,3,4,-tetrahydro - 2-carboxy-3,6,7-trihydroxynaphth-4-yl - γ-lactone, 2,2,3,3-tetramethyl - 4-(3,4-dihydroxylphenyl)butyl, 4-hydroxylphenyl and alkyl derivatives thereof, 4-hydroxyphenylalkyl and alkyl derivatives thereof, 4-hydroxyphenylthio and alkyl derivatives thereof; $R^3$ is a member selected from the group consisting of hydrogen, hydroxyl, alkyl having from 1 to about 10 carbon atoms, aroyl having from 6 to about 10 carbon atoms and a 6 to about 20 carbon atoms radical, selected from the group consisting of 2-hydroxybenzyl and alkyl derivatives thereof, phenyl-2-hydroxybenzyl and alkyl derivatives thereof, 2-hydroxyphenylthio and alkyl derivatives thereof, and R and $R^1$ when taken together, form a member selected from the group consisting of a divalent, 1,4-butadienylene radical and a monoalkyl-substituted 1,4-butadienylene radical of up to about 15 carbons; with the proviso that said R, $R^1$, $R^2$, and $R^3$ are so chosen that said phenolic compound contains at least one hydroxyl group per compound, but no more than two hydroxyl groups on a single benzene ring; (2) an aromatic amine represented by the formula:

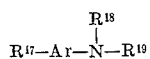

wherein Ar is an aromatic nucleus of 6 to about 10 carbon atoms; $R^{17}$ is a member selected from the group consisting of hydrogen, amino, mono-substituted amino selected from the group consisting of phenylamino, naphthylamino or alkylamino having from 1 to about 15 carbon atoms and disubstituted amino having from 2 to about 15 carbon atoms selected from the group consisting of dialkylamino, phenylalkyl amino and naphthylalkyl amino; $R^{18}$ is a memebr selected from the group consisting of hydrogen and alkyl from 1 to about 10 carbon atoms; and $R^{17}$ and $R^{18}$ when taken together, form a divalent radical which, when taken together with —Ar$NR^{19}$, forms a 5 to 6 carbon atom fused ring bonded to Ar through adjacent carbons; $R^{19}$ is selected from the group consisting of hydrogen or arylaminoalkyl wherein such aryl group is phenyl or naphthyl, the alkyl group containing about 2 to about 3 carbons; and (3) a condensation product of (a) an aromatic amine selected from the group consisting of aniline, naphthylamine, diphenylamine and N-phenylnaphthylamine and (b) a carbonyl compound selected from the group consisting of aldol, acetaldehyde, butyraldehyde, and acetone.

10. The process as claimed in claim 9 wherein said compound selected from said group is incorporated into said slurry prior to said spray drying.

11. The method of claim 9 wherein said phenolic compound is of the formula:

(V)

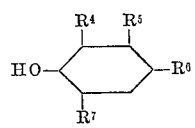

wherein $R^4$ is selected from the group consisting of 1 to about 10 carbon atom alkyl or 7 to about 10 carbon atom aralkyl; $R^5$ is selected from the group consisting of hydrogen, alkyl of up to about 10 carbons, alkoxy of up to about 10 carbons or benzoyloxy; $R^6$ is selected from the group consisting of hydrogen, alkyl of up to about 10 carbons, alkoxy of up to about 10 carbons; alkoxyalkyl of up to about 10 carbons and dialkylaminoalkyl of 3 to about 10 carbons; and $R^7$ is selected from the group consisting of hydrogen, alkyl of up to about 10 carbons, or phenylcarbonyl.

12. The method of claim 9 where said phenolic compound is of the formula:

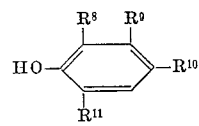

wherein $R^8$ is selected from the group consisting of hydrogen, hydroxyl or alkyl of 1 to about 10 carbons; $R^9$ is selected from the group consisting of hydrogen or alkyl of 1 to about 10 carbons; $R^{10}$ is selected from the group consisting of hydrogen, hydroxyl, carboxyl, or alkoxycarbonyl of 1 to about 15 carbons; and $R^{11}$ is selected from the group consisting of hydrogen, hydroxyl or alkyl of 1 to about 10 carbons.

13. The method of claim 9 where said phenolic compound is of the formula:

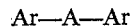

wherein A is selected from the group consisting of thio, benzylidine or methylene; and Ar is selected from the group consisting of a 2-hydroxyphenyl radical of the formula:

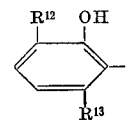

or a 2-hydroxy-6-alkyl-1-naphthyl group the alkyl radical of which contains 1 to about 10 carbons wherein $R^{12}$ is selected from the group consisting of hydrogen, chloro or alkyl of 1 to about 10 carbons and $R^{13}$ is selected from the group consisting of chloro or alkyl of 1 to about 5 carbons.

14. The method of claim 9 where said phenolic compound is of the formula:

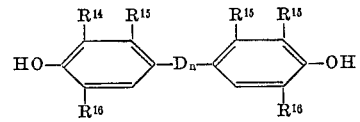

wherein $R^{14}$, $R^{15}$ and $R^{16}$ are selected from the group consisting of hydrogen or lower alkyl of 1 to about 6 carbons, D is selected from the group consisting of a thio group or an alkylidene group of from 1 to about 6 carbons and $n$ is an integer having a value of from 0 to 1, inclusive.

15. The method of claim 9 where said amine is of the formula:

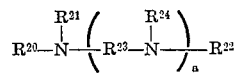

wherein $a$ is 0 to 1; $R^{20}$ is selected from the group consisting of hydrogen, of 1 to about 20 carbon alkyl, phenyl or naphthyl; $R^{21}$ is selected from the group consisting of hydrogen or a 1 to about 6 carbon alkyl; $R^{22}$ is selected from the group consisting of hydrogen, of 1 to about 20 carbon alkyl or phenyl; $R^{23}$ is 1,4-phenylene; and $R^{24}$ is hydrogen or lower alkyl and is preferably hydrogen.

16. The method of claim 9 where said amine is of the formula:

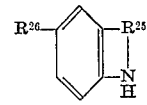

wherein $R^{25}$ is a divalent radical of up to 10 carbons which, when taken with the aminophenyl group, forms a non-aromatic nitrogen heterocyclic ring of from 5 to 6 ring members and alkyl substitutes thereof and $R^{26}$ is selected from the group consisting of hydrogen, alkyl of 1 to about 15 carbons and alkoxy of 1 to about 15 carbons.

17. The method of claim 9 where said compound is selected from at least one member of the group consisting of butylated hydroxyanisole; 2,2'-methylenebis(4-methyl - 6-tertiary-butylphenol; polybutylated 2,2-bis(4-hydroxyphenol)propane; 2,2 - bis(4-hydroxyphenol)propane; ditertiarybutyl-p-cresol, trimeric-diphenylamine-acetone condensate; nordihydroguaiaretic acid; p-(p-toluenesulfonylamine) diphenylamine; hydroquinone; and propyl gallate.

No references cited.

LEON D. ROSDOL, *Primary Examiner.*

S. D. SCHWARTZ, *Assistant Examiner.*